United States Patent
Curtis et al.

(10) Patent No.: US 9,559,971 B2
(45) Date of Patent: Jan. 31, 2017

(54) DEVICE CONFIGURATION

(71) Applicant: Metaswitch Networks Ltd, Enfield (GB)

(72) Inventors: Michael Curtis, San Francisco, CA (US); Alex Pollitt, San Francisco, CA (US); Simon Wingrove, San Francisco, CA (US); Shaun Crampton, San Francisco, CA (US)

(73) Assignee: METASWITCH NETWORKS LTD, Enfield (GB)

( * ) Notice: Subject to any disclaimer, the term of this patent is extended or adjusted under 35 U.S.C. 154(b) by 217 days.

(21) Appl. No.: 14/473,971

(22) Filed: Aug. 29, 2014

(65) Prior Publication Data

US 2016/0065482 A1 Mar. 3, 2016

(51) Int. Cl.
*G06F 15/177* (2006.01)
*H04L 12/851* (2013.01)
*H04L 12/26* (2006.01)
*H04L 12/24* (2006.01)

(52) U.S. Cl.
CPC ....... *H04L 47/2483* (2013.01); *H04L 41/0896* (2013.01); *H04L 43/026* (2013.01); *H04L 43/04* (2013.01)

(58) Field of Classification Search
CPC .... H04L 47/2483; H04L 43/026; H04L 43/04; H04L 41/0803
See application file for complete search history.

(56) References Cited

U.S. PATENT DOCUMENTS

| | | | | |
|---|---|---|---|---|
| 7,904,571 B1* | 3/2011 | Kalmanek, Jr. | ...... | H04L 41/0823 709/229 |
| 2002/0165980 A1* | 11/2002 | Brown | ................ | H04L 12/5602 709/242 |
| 2006/0045128 A1* | 3/2006 | Madour | .................. | H04L 47/10 370/466 |

(Continued)

FOREIGN PATENT DOCUMENTS

WO 2016014338 A1 1/2016

OTHER PUBLICATIONS

Network Working Group Request for Comments: 1812 (Network Working Group Request for Comments: 1812, Standards Track, Requirements for IP Version 4 Routers, Jun. 1995, Cisco Systems, F. Baker, retrieved on May 5, 2016, from https://www.ietf.org/rfc/rfc1812.txt; hereinafter RFC1812).*

*Primary Examiner* — Tauqir Hussain
*Assistant Examiner* — Michael A Keller
(74) *Attorney, Agent, or Firm* — EIP US LLP (57) ABSTRACT

Measures for configuring a network aggregation device in a network. First routing data for a plurality of internet protocol (IP) flows configured on at least one edge device of a service provider network is identified. The edge device is located towards the service provider network from the network aggregation device. At least one utility metric for at least one IP flow in the identified plurality of IP flows is calculated. The at least one utility metric is calculated at least in part on the basis of one or more destination IP addresses associated with the at least one IP flow. A subset of IP flows from the identified plurality of IP flows is selected at least in part on the basis of the calculated at least one utility metric. Second routing data for the selected subset of IP flows is configured on the network aggregation device.

19 Claims, 4 Drawing Sheets

(56) References Cited

U.S. PATENT DOCUMENTS

| | | | |
|---|---|---|---|
| 2006/0251009 A1 | 11/2006 | Thommana | |
| 2007/0153707 A1* | 7/2007 | Thubert | H04L 45/025 370/254 |
| 2008/0307519 A1* | 12/2008 | Curcio | H04L 63/0227 726/15 |
| 2011/0292939 A1 | 12/2011 | Subramaian et al. | |
| 2012/0060198 A1* | 3/2012 | Tremblay | H04L 12/1407 726/1 |
| 2012/0257566 A1* | 10/2012 | Le | H04L 45/308 370/328 |
| 2013/0170351 A1* | 7/2013 | Reznik | H04W 28/10 370/235 |
| 2013/0321458 A1* | 12/2013 | Miserendino | H04L 41/0883 345/629 |
| 2014/0036769 A1* | 2/2014 | Stojanovski | H04W 24/04 370/328 |
| 2014/0355563 A1* | 12/2014 | Sane | H04W 36/0055 370/331 |
| 2014/0355608 A1 | 12/2014 | Weldon et al. | |

\* cited by examiner

DEVICE CONFIGURATION

BACKGROUND OF THE INVENTION

1. Field of the Invention

The present disclosure relates to device configuration. In particular, but not exclusively, the present disclosure relates to configuring a network aggregation device in a network.

2. Description of the Related Technology

Aggregation devices are in widespread use in networks such as service provider networks. The role of a network aggregation device is essentially that of a multiplexer. In one direction into the service provider network (sometimes referred to as the 'north' direction), a network aggregation device combines traffic from several interfaces onto a single, higher-capacity interface, which reduces the number of physical ports occupied on a device located towards the service provider network such as a service provider network edge device (which is usually relatively expensive). In the opposite direction out of the service provider network (sometimes referred to as the 'south' direction), a network aggregation device demultiplexes traffic onto the correct outgoing interface, for example based on some form of encapsulation such as virtual local area network (VLAN) tag or multiprotocol label switching (MPLS) label. The multiplex/demultiplex rules are very basic, involving only the interface numbers and tags/labels as match criteria. Complex IP forwarding rules are implemented on the service provider network edge device.

A downside is that when one subscriber network edge device needs to send traffic via another subscriber network edge device, the packets get forwarded all the way to the service provider network edge device, where an internet protocol (IP) routing decision is made, then the packet is forwarded back through the network aggregation device to the other subscriber network edge device. This traffic forwarding pattern is sometimes referred to as 'tromboning' and should be avoided where possible.

SUMMARY

According to first embodiments, there is a method of configuring a network aggregation device in a network, the method comprising: identifying first routing data for a plurality of internet protocol (IP) flows configured on at least one edge device of a service provider network, wherein the edge device is located towards the service provider network from the network aggregation device; calculating at least one utility metric for at least one IP flow in the identified plurality of IP flows, the at least one utility metric being calculated at least in part on the basis of one or more destination IP addresses associated with the at least one IP flow; selecting a subset of IP flows from the identified plurality of IP flows at least in part on the basis of the calculated at least one utility metric; and configuring second routing data for the selected subset of IP flows on the network aggregation device.

According to second embodiments, there is a system for use in configuring a network aggregation device in a network, the system comprising: at least one processor; and at least one memory including computer program code, the at least one memory and the computer program code being configured to, with the at least one processor, cause the system at least to: identify first routing data for a plurality of internet protocol (IP) flows configured on at least one edge device of a service provider network, wherein the edge device is located towards the service provider network from the network aggregation device; calculate at least one utility metric for at least one IP flow in the identified plurality of IP flows, the at least one utility metric being calculated at least in part on the basis of one or more destination IP addresses associated with the at least one IP flow; select a subset of IP flows from the identified plurality of IP flows at least in part on the basis of the calculated at least one utility metric; and configure second routing data for the selected subset of IP flows on the network aggregation device.

According to third embodiments, there is a computer program product comprising a non-transitory computer-readable storage medium having computer readable instructions stored thereon, the computer readable instructions being executable by a computerized device to cause the computerized device to perform a method of configuring a network aggregation device in a network, the method comprising: identifying first routing data for a plurality of internet protocol (IP) flows configured on at least one edge device of a service provider network, wherein the edge device is located towards the service provider network from the network aggregation device; calculating at least one utility metric for at least one IP flow in the identified plurality of IP flows, the at least one utility metric being calculated at least in part on the basis of one or more destination IP addresses associated with the at least one IP flow; selecting a subset of IP flows from the identified plurality of IP flows at least in part on the basis of the calculated at least one utility metric; and configuring second routing data for the selected subset of IP flows on the network aggregation device.

Embodiments comprise a computer program including a set of instructions, which, when executed by a computerized device, are configured to cause the computerized device to perform the method of the first embodiments.

Further features of embodiments of the present disclosure will become apparent from the following description of preferred embodiments, given by way of example only, which is made with reference to the accompanying drawings.

DETAILED DESCRIPTION OF CERTAIN INVENTIVE EMBODIMENTS

Figure 1:
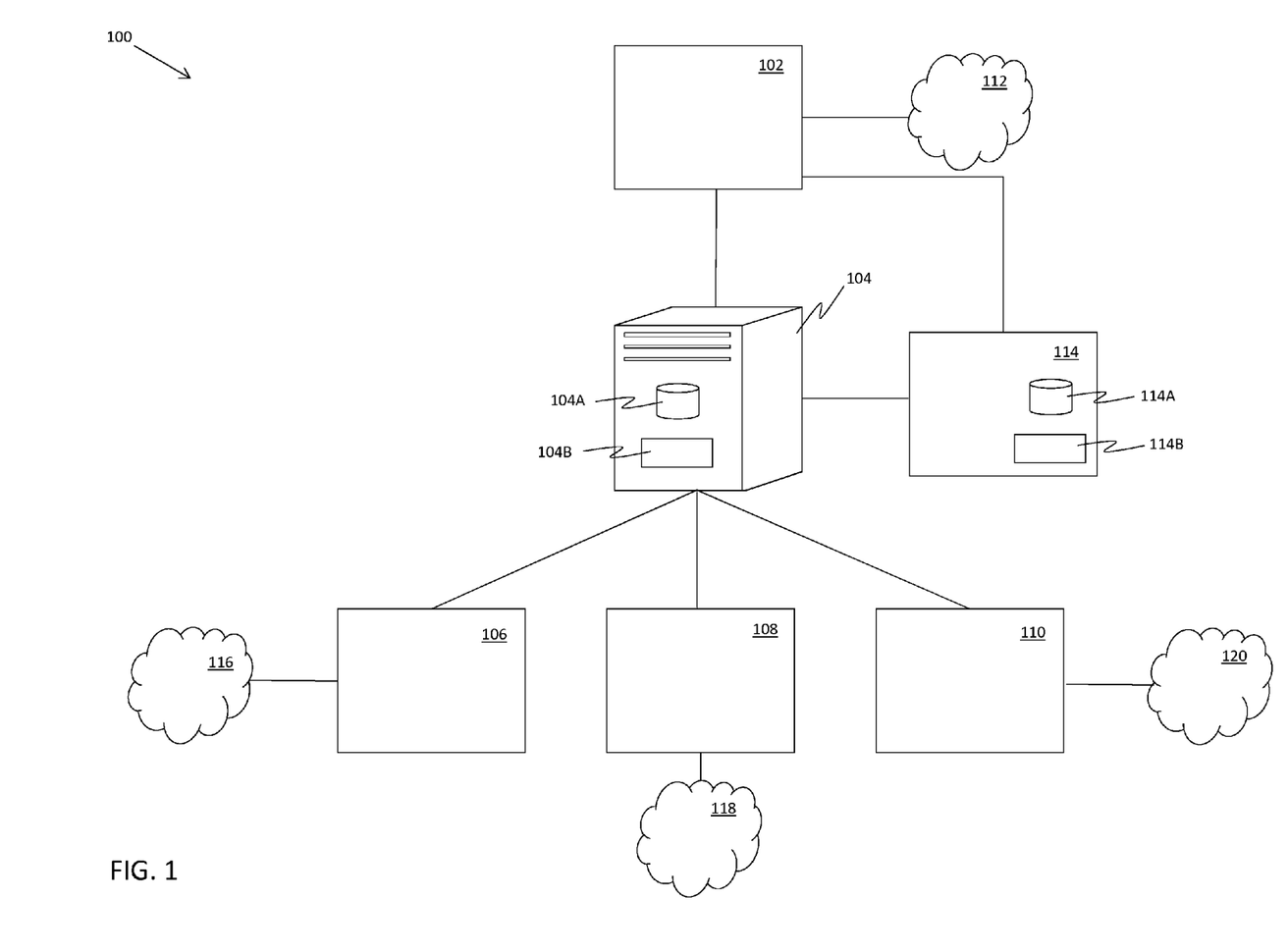
FIG. 1 shows a network according to one or more embodiments of the present disclosure.

FIG. 1 shows a network 100 according to embodiments of the present disclosure. Network 100 comprises a controller node 114, a service provider network edge device 102, a network aggregation device 104 and a plurality of subscriber network edge devices 106, 108, and 110. Network 100 could for example comprise one or more data communications and/or telecommunications networks comprising one or more packet-switched and/or one or more circuit-switched parts.

Service provider network edge device 102 (or 'PE device', where the PE stands for service provider network edge) is located towards the service provider network with respect to network aggregation device 104 in network 100.

Service provider network edge device 102 is connected to one or more other network nodes, devices or networks 112. Service provider network edge device 102 comprises a network node, for example a network router or network switch responsible for providing routing/switching functionality within one or more parts of network 100. Network 100 may comprise further service provider network edge devices (not shown).

Network aggregation device 104 is located away from the service provider network with respect to service provider network edge device 102 in network 100. Network aggregation device 104 comprises a database 104A for storing data such as forwarding rules according to embodiments. Network aggregation device 104 comprises a processor (or processing system) 104B for carrying out various data processing tasks according to embodiments. Network aggregation device 104 comprises a network node, for example a network switch or network router responsible for providing switching/routing/multiplexing/demultiplexing functionality within one or more parts of network 100. Network 100 may comprise further network aggregation devices (not shown).

Subscriber (or 'user') network edge devices 106, 108, and 110 (or 'CE devices', where the CE stands for consumer network edge or customer network edge) are located away from the service provider network with respect to network aggregation device 104 in network 100. Subscriber network edge devices 106, 108, and 110 are connected to one or more subscriber devices (or 'customer/user devices', 'user equipment', 'endpoints', or 'endpoint devices') or subscriber LANs 116, 118, 120 respectively, possibly via one or more gateway nodes/devices (not shown). Subscriber network edge devices 106, 108, 110 may for example comprise IP routers or other local-loop facing devices. Network 100 may comprise further subscriber network edge devices (not shown).

Controller node 114 is connected to one or more of network aggregation device 104 and service provider network edge device 102. In embodiments, controller node 114 controls configuration of network aggregation device 104. In embodiments controller node 114 carries out some or all of the data processing tasks according to embodiments. Controller node 114 comprises a database (or other memory storage) 114A for storing data according to embodiments, for example tree data structure or route data. Controller node 114 comprises a processor (or processing system) 114B for carrying out various data processing tasks according to embodiments. Controller node 114 comprises a computing device (or computing devices) such as a server or virtual machine. In alternative embodiments, one or more data processing tasks are performed by network aggregation device 104.

Embodiments enable avoidance of tromboning by configuring network aggregation device 104 with enough of the IP routing table of service provider network edge device 102 such that network aggregation device 104 knows when to forward packets directly, rather than passing the packets on to the service provider network edge device 102.

Embodiments may comprise measures for choosing the appropriate flows to install on an intelligent network aggregation device such as network aggregation device 104. It is desirable to implement network aggregation device 104 on relatively cheap, commodity hardware to keep costs low. One trade-off is in the number of IP flows (or 'IP matching rules') that can be loaded onto network aggregation device 104 before its memory (such as database 104A) is full. Various mechanisms could be employed by which network aggregation device 104 learns the routing table on service provider network edge device 102. Consider the case where the learned routing table is too large to fit in the switching hardware on network aggregation device 104: not all IP flows can fit.

Some embodiments involve choosing the flows which maximize the amount of work network aggregation device 104 'offloads' from service provider network edge device 102. In embodiments, choosing which flows to offload is subject to the constraint that the forwarding rules do not result in traffic being dropped by network aggregation device 104. In embodiments, the offloading is subject to the constraint that the forwarding rules do not redirect traffic that service provider network edge device 102 would have forwarded elsewhere in the network; in some such embodiments, only tromboned traffic is redirected by network aggregation device 104.

One way to avoid the problem of running out of space in the flow table on network aggregation device 104 is to arrange the network such that all the required flows will fit. This might mean choosing a device with a larger flow table, or limiting the number of subscriber network edge device connections. A drawback of this approach is that it is expensive and disruptive to alter, either requiring total device replacement or relocating customers from one aggregation device to another. In this approach, table size limits are a 'hard limit'. Once the hard limit is exceeded, the consequences include total loss of IP connectivity for certain customers to certain destinations.

In contrast, embodiments of the present disclosure allow a graceful degradation of the aggregation offloading. Network aggregation device 104 naturally falls back on service provider network edge device 102 to maintain connectivity. This may happen via undesirable tromboning, but connectivity is not lost.

The size of the IP forwarding table in a typical Internet network is dynamic, and naturally increases as more networks are interconnected. Depending on a 'hard limit' approach means careful monitoring and requires a margin of safety in the form of overprovisioning the devices for the actual task. In addition, not all flows are created equal in terms of how much 'offload' they provide to the service provider network edge device, which means that valuable table space needs to be allocated to flows that do not provide high value. In contrast, embodiments of the present disclosure enable full (or nearly full), efficient use of the flow table on the network aggregation device.

Embodiments may comprise measures, including methods, systems (or 'apparatus') and computer program products, for configuring a network aggregation device 104 in network 100. Various data processing tasks are performed by processor (or processing system) 114B of controller node 114 according to embodiments.

Controller node 114 identifies first routing data for a plurality of internet protocol (IP) flows configured on at least one service provider network edge device 102 located towards the service provider network from network aggregation device 104. At least one utility metric is calculated (for example by controller node 114) for at least one IP flow in the identified plurality of IP flows. The at least one utility metric is calculated at least in part on the basis of one or more destination IP addresses associated with the at least one IP flow. Controller node 114 selects a subset of IP flows from the identified plurality of IP flows at least in part on the basis of the calculated at least one utility metric, and configures second routing data for the selected subset of IP flows on network aggregation device 104.

In embodiments, controller node 114 configures the second routing data on network aggregation device 104 by transmitting one or more add and/or update routing data and/or IP flow commands to network aggregation device 104 which are operable to command network aggregation device 104 to update its routing data/IP flow configuration.

In embodiments, the first routing data defines how traffic associated with the plurality of IP flows should be forwarded by the at least one service provider network edge device 102, and the second routing data defines how traffic associated with the selected subset of IP flows should be forwarded by network aggregation device 104.

In embodiments, the second routing data indicates that traffic associated with the selected subset of IP flows which is received from at least a first subscriber network edge device 106 located away from the service provider network with respect to network aggregation device 104 should be forwarded by network aggregation device 104 to at least a second subscriber network edge device 108 located away from the service provider network with respect to network aggregation device 104.

Some embodiments do not include direct observation of the traffic flows (e.g. packet sniffing), which can be desirable for simplicity in hardware implementation. In the absence of observed destination information, all destination IP addresses are considered to be equally likely to appear in an incoming traffic stream. In embodiments, this leads to a utility metric for a candidate set of flows to program: the total number of IP addresses which would be captured and redirected to connected subscriber network edge device next hops.

Embodiments may comprise an IP forwarding implementation which is structured so that the rule that gets executed for a particular packet is the one with the longest matching IP address prefix. Thus, in embodiments, the IP flows that are programmed on network aggregation device 104 are not independent; faithfully preserving the forwarding behavior of service provider network edge device 102 means that installing (i.e. configuring on network aggregation device 104) a given IP flow requires installation of all other flows which have a matching, but longer prefix than the given IP flow. These may be flows that forward data to a different subscriber network edge device connected to the switch, or they may be flows that service provider network edge device 102 would forward elsewhere in the network. The latter type of flows are referred to as "exception" flows (as in, they are exceptions to the rule for forwarding to a subscriber network edge device).

In embodiments, the selecting comprises preferentially selecting at least one IP flow over at least one other IP flow on the basis of the at least one IP flow having a higher utility metric than the at least one other IP flow. In embodiments, one or more flows are preferentially selected such that they have the highest utility per space they occupy in the aggregator flow table, when all additionally required flows are included.

In embodiments, the at least one utility metric is calculated at least in part on the basis of one or more destination IP addresses associated with the at least one IP flow for which traffic would be forwarded by the network aggregation device to next hop subscriber network edge devices located away from the service provider network with respect to the network aggregation device. In embodiments, flows which involve transfer of data between subscriber network edge devices have higher utility metrics than flows which do not involve transfer of data between subscriber network edge devices; such embodiments therefore enable avoidance of traffic tromboning.

Embodiments may comprise, in response to selecting in the subset a given IP flow from the identified plurality of IP flows, further selecting in the subset, IP flows from the identified plurality of IP flows which have a matching, longer destination IP address prefix than the given IP flow. In embodiments, at least one IP flow in the further selected IP flows is identified for which the first routing data indicates that the at least one service provider network edge device should forward traffic to a destination in the network other than at least one subscriber network edge device located away from the service provider network with respect to the network aggregation device; in such embodiments, the identified at least one IP flow is treated as an exception flow. In embodiments, the identified at least one IP flow is configured on network aggregation device 104 to operate as an exception flow.

The interdependency between flows can be expressed as a tree data structure according to embodiments; in some such embodiments, the IP prefix identifies the relative location in the tree and child nodes are IP subsets of their parents. In embodiments, installing a flow requires also installing every flow in the sub-tree starting from the corresponding node to maintain IP forwarding.

Embodiments may comprise representing the interdependencies between flows in the plurality of IP flows as a tree data structure, where each IP flow in the plurality is represented by a node in the tree data structure. In embodiments, the destination IP address prefix of each IP flow determines the relative location of its corresponding node in the tree data structure, and child nodes are destination IP address prefix subsets of their parent nodes.

Figure 2:
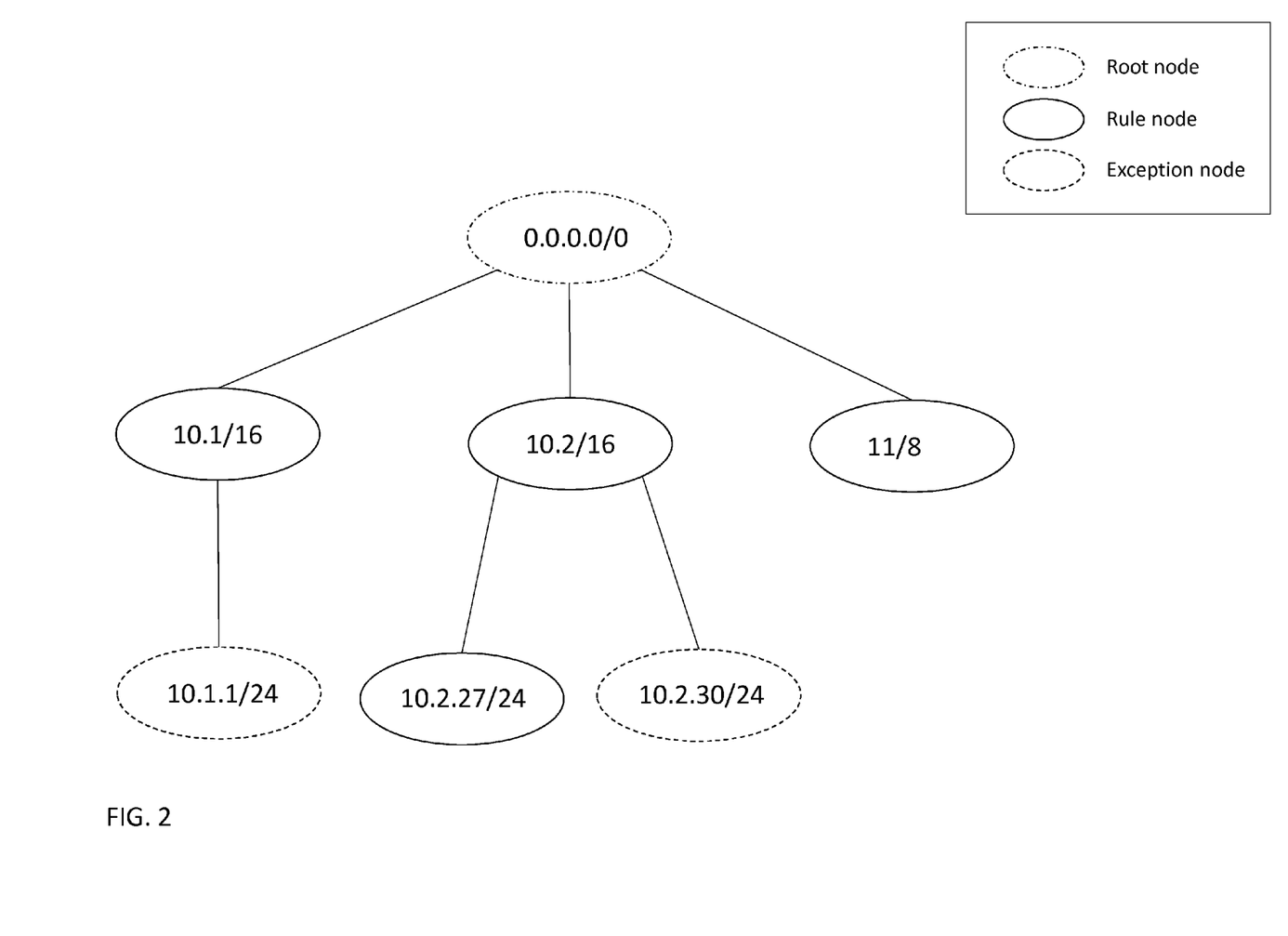
FIG. 2 shows a tree data structure according to one or more embodiments of the present disclosure.

FIG. 2 shows a tree data structure according to embodiments of the present disclosure. The tree data structure shows an example representation of a number of IP flows given in classless inter-domain routing (CIDR) notation. Each flow includes an IP network prefix in the form of an IP Version 4 (IPv4) address where up to 32 bits are given as one or more decimal numbers each representing 8-bits and separated by dots, followed by a forward slash character, which is in turn followed by the prefix size as a decimal number.

In the example of FIG. 2, the node at the top of the tree with the dot-dashed outline comprises a root node and does not form part an IP flow itself. Each of the nodes with the solid outline represent IP flows whose next hop is one of the connected subscriber network edge devices. Each of the nodes with the dashed outline represent exceptions to IP flows, that is, IP flows whose next hop is not one of the connected subscriber network edge devices and is instead, a device located elsewhere in the provider network 112.

The node corresponding to an IP flow with destination IP address prefix 10.1/16 has a descendent node with destination IP address prefix 10.1.1/24. Here, 10.1.1/24 is prefixed by 10.1/16, but the former is an exception flow so is configured to operate as an exception on network aggregation device 104.

The node corresponding to an IP flow with destination IP address prefix 10.2/16 has two descendent nodes with destination IP address prefixes 10.2.27/24 and 10.2.30/24 where both 10.2.27/24 and 10.2.30/24 are prefixed by 10.2/16. The prefix 10.2.27/24 is in the sub-tree of the node with prefix 10.2/16 and corresponds to a rule node so should be configured, whereas prefix 10.2.30/24 is in the sub-tree of the node with prefix 10.2/16, but corresponds to an exception node so should not be configured.

In embodiments, in response to selecting in the subset a given IP flow represented in the tree data structure, the selecting comprises further selecting in the subset IP flows corresponding to nodes in the sub-tree of the node corresponding to the given IP flow.

Embodiments may comprise identifying at least one IP flow corresponding to a node in the sub-tree of the node corresponding to the given IP flow node for which the first routing data indicates that the at least one service provider network edge device should forward traffic to a destination in the network other than at least one subscriber network edge device located away from the service provider network with respect to the network aggregation device; in such embodiments, the identified at least one IP flow is configured on the network aggregation device to operate as an exception flow.

Embodiments may comprise choosing the flows to program on network aggregation device 104 using the tree data structure described above. In embodiments, two quantities are defined for each node in the tree data structure. A first quantity is the cost which is the total number of flows to program the node and all its descendants. A second quantity is the benefit which is the number of IP destinations that match the node's prefix and which would ultimately be forwarded to a subscriber network edge device (in other words, the total number of addresses that match the prefix, minus the number of addresses which match an exception flow). Both of the quantities can be computed efficiently by a recursive computation over the tree data structure according to embodiments.

Embodiments may comprise proceeding as follows until the entire tree data structure is programmed (i.e. all flows have been configured on network aggregation device 104), or network aggregation device 104 runs out of space (i.e. memory 104A on network aggregation device 104 is full):

1. Search the tree data structure for the node which has the largest ratio of benefit to cost, and whose cost is less than the amount of remaining space on network aggregation device 104.

2. Program all the flows for that node and its descendants on network aggregation device 104.

3. Update the cost and benefit of all ancestors of the programmed node, removing the contribution to cost and benefit due to the programmed node.

4. Return to step 1.

Embodiments may comprise calculating, for each node in the tree data structure, a cost quantity defined as the number of IP flows required to configure IP flows corresponding to the respective node and all of its descendant nodes on the network aggregation device, and a benefit quantity defined as the number of IP destination addresses that match the destination IP address prefix of the respective node minus the number of IP destination addresses which match an exception IP flow. Embodiments comprise preferentially selecting at least one IP flow over at least one other IP flow on the basis of the at least one IP flow having a higher benefit to cost ratio than the at least one other IP flow.

In some embodiments, network aggregation device 104 has a given amount of memory storage (in database 104A) for storing the second routing data for the selected subset of IP flows; in such embodiments, the selection and configuring are performed according to the following iterative steps (steps a) to d)) until all of the IP flows in the plurality are selected and corresponding second routing data is configured on network aggregation device 104 or the given amount of memory storage runs out of space:

a) Search the tree data structure for the node which has the largest benefit to cost ratio and whose cost is less than the amount of remaining memory storage space on the network aggregation device;

b) Select all the IP flows corresponding to the node identified by the search and its descendants, wherein second routing data for these IP flows is configured on the network aggregation device;

c) Update the cost and benefit quantities of all ancestors of the node identified by the search including removing the contribution to cost and benefit due to the node identified by the search; and d) Return to step a).

Some embodiments comprise controller node 114 determining the remaining memory storage space on network aggregation device 104 by querying network aggregation device 104.

If it is not possible to query network aggregation device 104 for determining the remaining space in its flow table, then an estimated remaining space can be employed according to embodiments, for example proceeding iteratively as follows:

0. Set estimated remaining space to +infinity.

1. Search the tree for the node which has the largest ratio of benefit to cost, and whose cost is less than the estimated remaining space.

2. Program all the flows for that node and its descendants.

3. If programming fails because the memory storage (in database 104A) on network aggregation switch 104 is full, remove any flows that were added in the current iteration, then set the estimated remaining space to the cost of the node we tried to program, minus 1, and return to step 1.

4. Update the cost and benefit of all ancestors of the programmed node, removing the contribution to cost and benefit due to the programmed node.

5. If the estimated remaining space is not infinity, subtract the cost of the flows that were programmed this iteration.

6. Return to step 1.

In some scenarios, it may not be possible for controller node 114 to query network aggregation device 104 in order to find out how much more memory storage space it has remaining, in which case the remaining memory storage space on network aggregation device 104 can be estimated according to embodiments.

Embodiments may comprise determining the remaining memory storage space on network aggregation device 104 by estimating the remaining memory storage space on network aggregation device 104; in some such embodiments, the estimation comprises initially setting the estimated remaining memory storage space to be an arbitrary large value, performing the selection and configuring according to steps a) to d) unless the configuring fails due to the given amount of memory storage having run out of space, and in response to the configuring failing, deleting second routing data corresponding to IP flows configured on network aggregation device 104 in the current iteration, and reducing the estimated remaining memory storage space by a predetermined value and performing the selection and configuring according to steps a) to d) until the configuring does not fail.

Embodiments described above operate using intrinsic information of the IP routes. However, the actual utility of an offload from a service provider network edge device 102 depends on the actual traffic flowing; an IP prefix contains a small number of addresses and might nonetheless have a lot of traffic being sent to it. Consider, for example, a corporate campus using network address translation (NAT) at its border to limit the number of public IP addresses it requires. Many hardware switches additionally include capabilities to observe characteristics of the actual traffic passing the switch. This information could augment or supplant the utility metric discussed above according to embodiments. Some embodiments therefore employ an observational approach where traffic is observed/monitored and data generated from such is input to the offloading process. In embodiments, controller node 114 can dynamically learn which flows are actually being used at any given time, and dynamic reprogramming of the flows configured on network aggregation device 104 can be performed to achieve maximal efficiency.

Some switches allow statistical sampling of forwarded packets (sFlow is a popular example framework). In embodiments, controller node 114 observes the destination IP addresses of the packets, counts and averages them, and feeds this information into the utility metric for the IP prefixes it observes.

Some switches can track the number of packets or total amount of data for each flow installed in the flow table. This allows controller node 114 to observe the relative effectiveness of the rules it has installed according to embodiments. Controller node 114 may not be able to directly detect what traffic is being missed by the current set of rules; however, flow rules of relatively low value can be periodically removed, freeing up space to test different rules according to embodiments. Such embodiments might be referred to as 'survival of the fittest' embodiments for evolving the set of flows to install on network aggregation device 104.

Embodiments comprise monitoring traffic flowing on IP flows in the plurality and/or the traffic flowing on IP flows in the selected subset, and preferentially selecting at least one IP flow over at least one other IP flow on the basis of the monitoring indicating that the at least one IP flow has a higher amount of traffic flowing than the at least one other IP flow.

Embodiments comprise monitoring traffic flowing on IP flows in the plurality and/or the traffic flowing on IP flows in the selected subset, and dynamically adapting the selection of IP flows to maximize the volume of traffic flowing on IP flows in the selected subset compared to the volume of traffic flowing on IP flows in the plurality.

In embodiments, the monitoring comprises one or more of statistical sampling of forwarded packets, tracking the number of packets for one or more IP flows, and tracking the total amount of data for one or more IP flows.

In embodiments, the monitoring is carried out by controller node 114. In other embodiments the monitoring is carried out by one or more of service provider network edge device 102 and network aggregation device 104 and the results of the monitoring passed to controller node 114 for analyzing/processing.

In embodiments the second routing data is configured on a plurality of network aggregation devices arranged in a hierarchical tier arrangement. In embodiments, the second routing data is configured on a plurality of network aggregation devices arranged in a mesh arrangement. Other embodiments may combine both hierarchical tier and mesh arrangements.

Embodiments comprise arranging intelligent aggregation devices in a hierarchical fashion, which allows further savings by reducing the number of physical interfaces required on a single switch. Devices lower in the hierarchy can be even smaller and cheaper, since the flow table requirements generally scale with the number of connected subscriber network edge devices. The graceful degradation aspect of embodiments described herein means that bigger devices higher in the hierarchy (of which one needs fewer) means that cheaper edge-tier aggregation devices can safely pass packets up to higher layers if they cannot handle them locally.

Figure 3:
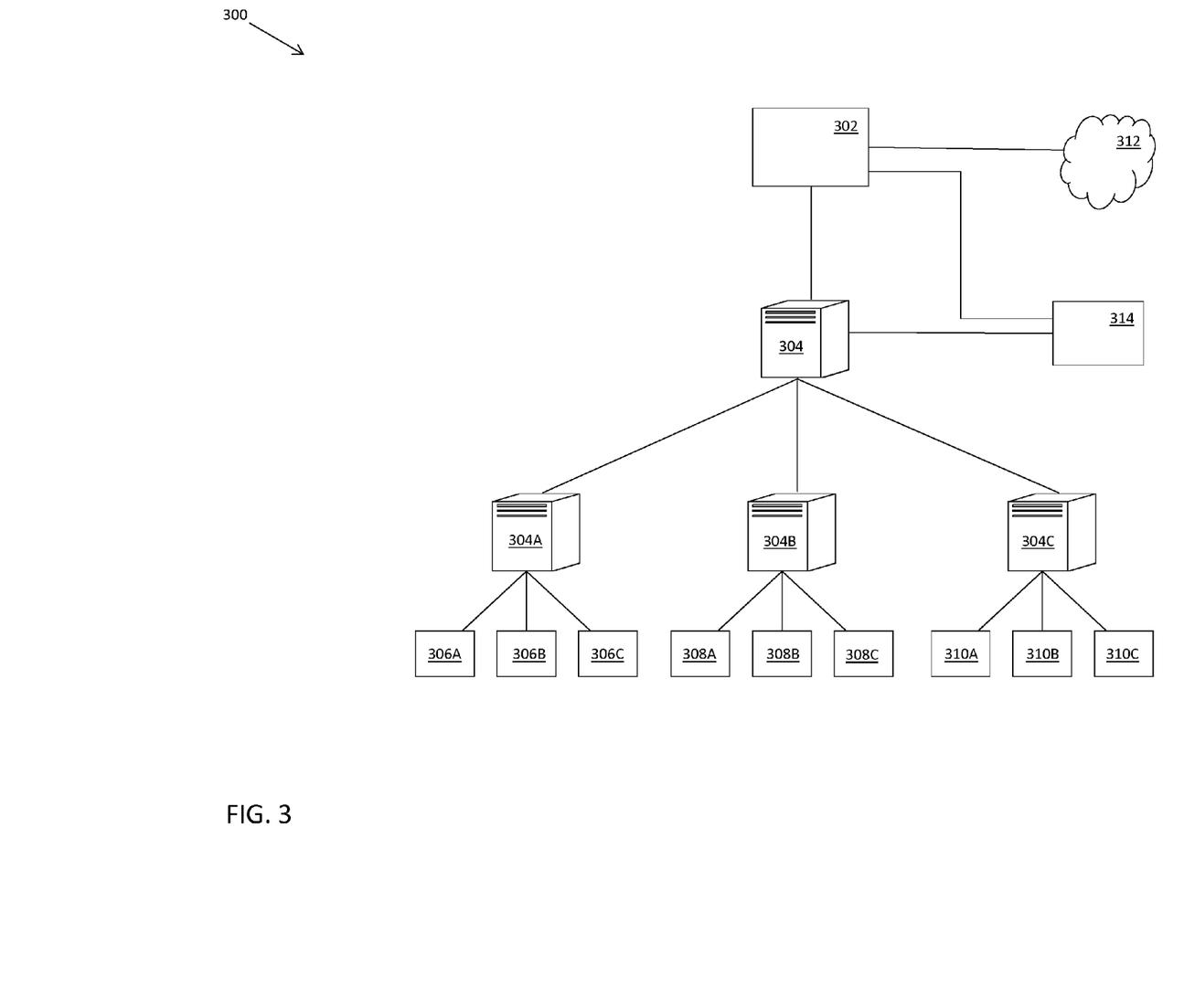
FIG. 3 shows a network according to one or more embodiments of the present disclosure.

FIG. 3 shows a network according to embodiments of the present disclosure where network aggregation devices 304, 304A, 304B and 304C are arranged in a hierarchical tier. Network aggregation device 304 is located in an upper tier, whereas network aggregation devices 304A, 304B and 304C are located in a lower tier. Network aggregation device 304 is connected to service provider network edge device 102, which is in turn connected to one or more other network nodes, devices or networks 312.

Network aggregation device 304A in the lower tier is connected to a number of subscriber network edge devices 306A, 306B, 306C. Network aggregation device 304B in the lower tier is connected to a number of subscriber network edge devices 308A, 308B, 308C. Network aggregation device 304C in the lower tier is connected to a number of subscriber network edge devices 310A, 310B, 310C. In the example network of FIG. 3, controller node 314 is connected to both service provider network edge device 302 and network aggregation device 304, but may alternatively only have a connection to one or the other of service provider network edge device 302 and network aggregation device 304. In further alternative embodiments, controller node 314 also has connections to network aggregation devices 304A, 304B and 304C.

Embodiments may comprise arranging intelligent aggregation devices in fully connected meshes, allowing them to exchange additional traffic over their interconnections that bypass multiple service provider network edge device. In this case, embodiments described above can be modified to take into account the relative value of flows to locally connected subscriber network edge devices versus flows that direct traffic to subscriber network edge devices somewhere else in the mesh.

Figure 4:
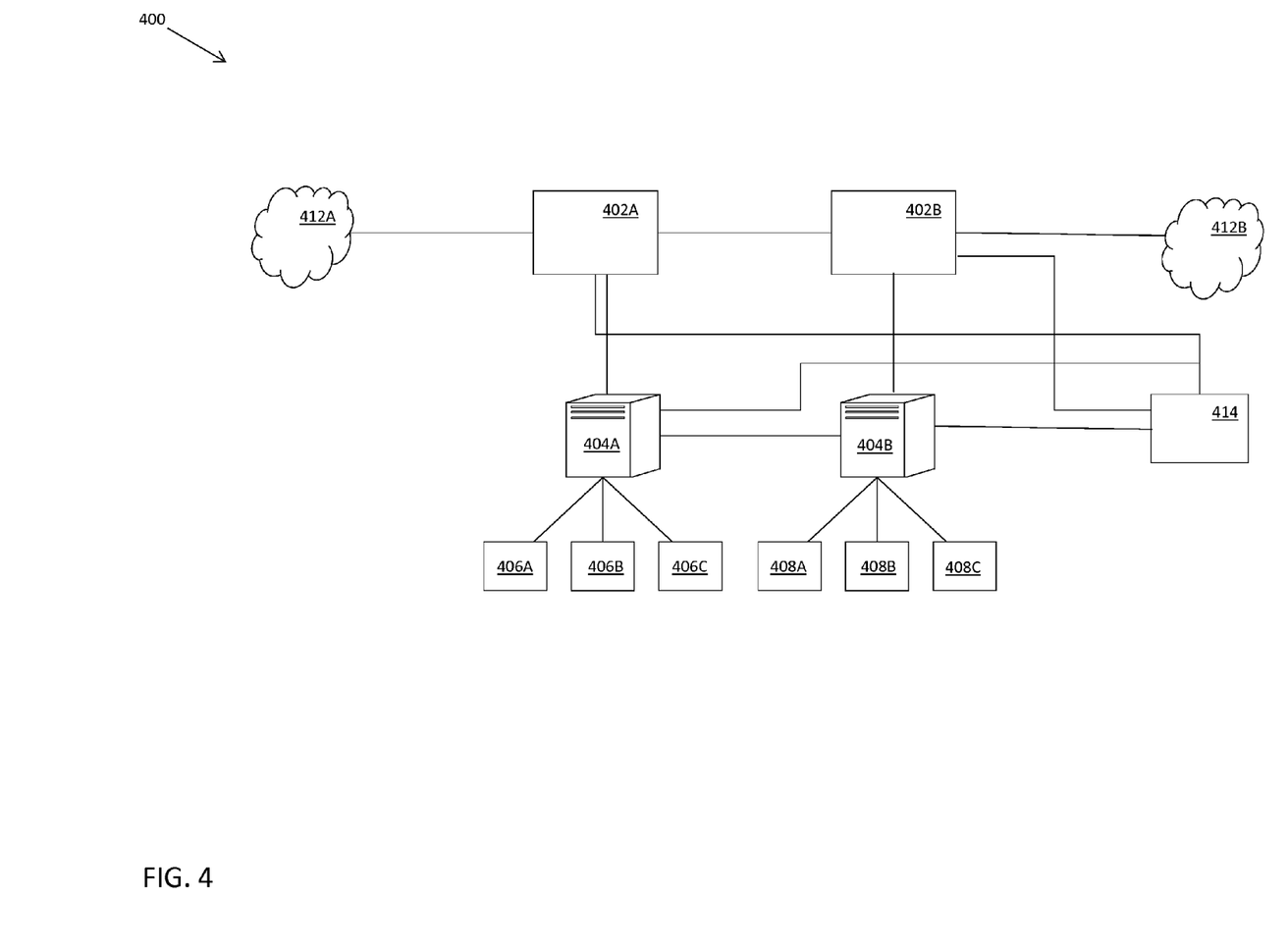
FIG. 4 shows a network according to one or more embodiments of the present disclosure.

FIG. 4 shows a network according to embodiments of the present disclosure where network aggregation devices 404A and 404B are arranged in a mess arrangement. Network aggregation device 404A is (directly) connected to network aggregation device 404B. Network aggregation device 404A is connected to service provider network edge device 402A, which is in turn connected to one or more other network nodes, devices or networks 412A. Network aggregation device 404B is connected to service provider network edge device 402B, which is in turn connected to one or more other network nodes, devices or networks 412B.

Network aggregation device 404A is connected to a number of subscriber network edge devices 406A, 406B, 406C. Network aggregation device 404B is (directly) connected to a number of subscriber network edge devices 408A, 408B, 408C. In the example network of FIG. 4, controller node 414 is connected to service provider network edge devices 402A and 402B as well as network aggregation devices 404A and 404B, but may alternatively only have a connection to any one, two or three of these devices.

In embodiments, controller node 114 (or 314, 414) comprises a processor or processing system, as depicted by processor 104B in FIG. 1. In embodiments, the processing system comprises one or more processors and/or memory. Each network node/entity as described in relation to any of the embodiments described above may similarly comprise a processor and/or processing system. One or more of the aspects of one or more of the embodiments described herein with reference to the drawings comprise processes performed by controller node 114. In embodiments, the controller node 114 comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc.

The above embodiments are to be understood as illustrative examples. Further embodiments are envisaged.

Some embodiments described above relate to building intelligent edge behavior that works between layers 2 (e.g. Ethernet) and 3 (e.g. IP). However, intelligence can be built into network devices at higher layers in the Open Systems Interconnection model (OSI) stack. Embodiments of the present disclosure can therefore be applied to offload application layer traffic. For example, consider cellular (or 'mobile') telephone phone calls. If a person A calls a person B in the building next door with their cell phone today, that call needs to be routed via a backhaul network to the call control before being returned to the original point of presence and out to person B. In such a situation, there may be an incentive to perform some additional processing on the central call control so the appropriate party (or parties) can be billed for the call. There may also be an incentive to aggregate and offload media according to embodiments. Furthermore, voice services are increasingly bundled into "unlimited" plans, and thus billing might be irrelevant at a future date, enabling smarter edge devices to offload call control as well.

Optimizing the characteristics of edge aggregation devices involves a trade-off between number of ports, bandwidth, forwarding table size, and cost. Eventually one of these limits the number of subscriber network edge devices that can be interconnected to a single service provider network edge device port. IPv6 addresses are four times the length of IPv4 addresses, which means higher cost to produce a forwarding table of equivalent size. Thus, the transition to IPv6 will tend to create additional pressure on forwarding table size, thus further increasing the importance of embodiments of the present disclosure.

Embodiments described above have assumed that the forwarding table in the service provider network edge device remains unchanged even as the intelligent aggregation device builds up its own forwarding state. The "offload" is in terms of traffic. However, in alternative embodiments, deeper coordination between the service provider network edge device and the control function(s) of the intelligent aggregation device according to embodiments enable an offload of forwarding table entries at the service provider network edge device. Therefore, in embodiments, the service provider network edge device forwarding table itself is offloaded to the network aggregation device.

Consider the following example: eight subscriber network edge devices, all connected through the same aggregation device occupy eight adjacent IP subnets. Even if the aggregation device is able to keep traffic to and from the subnets from tromboning somehow, the service provider network edge device still needs to maintain all eight prefixes in its forwarding table, since it needs to apply different encapsulations for correct demultiplexing at the aggregator. However, if the service provider network edge device knows the aggregation device can correctly switch those subnets, it can reduce those eight entries to a single entry for the prefix that contains the eight subnets according to embodiments.

In embodiments described above, various entities are described as devices, but could alternatively comprise other entities such as nodes, network nodes, switches, etc. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method of configuring a network aggregation device in a network, the method comprising:
   identifying first routing data for a plurality of internet protocol (IP) flows configured on at least one edge device of a service provider network, wherein the edge device is located towards the service provider network from the network aggregation device;
   calculating at least one utility metric for at least one IP flow in the identified plurality of IP flows, the at least one utility metric being calculated at least in part on the basis of one or more destination IP addresses associated with the at least one IP flow;
   selecting a subset of IP flows from the identified plurality of IP flows at least in part on the basis of the calculated at least one utility metric;
   configuring second routing data for the selected subset of IP flows on the network aggregation device; and
   representing interdependencies between flows in the plurality of IP flows as a tree data structure,
      wherein each IP flow in the plurality is represented by a node in the tree data structure,
      wherein a destination IP address prefix of each IP flow determines a relative location of its corresponding node in the tree data structure,
      wherein child nodes are destination IP address prefix subsets of their parent nodes, and
      wherein in response to selecting in the subset a given IP flow represented in the tree data structure, the selecting comprises further selecting in the subset IP flows corresponding to nodes in a sub-tree of the node corresponding to the given IP flow.

2. The method of claim 1, wherein the first routing data defines how traffic associated with the plurality of IP flows should be forwarded by the at least one service provider network edge device, and
   wherein the second routing data defines how traffic associated with the selected subset of IP flows should be forwarded by the network aggregation device.

3. The method of claim 1, wherein the second routing data indicates that traffic associated with the selected subset of IP flows which is received from at least a first subscriber network edge device located away from the service provider network with respect to the network aggregation device should be forwarded by the network aggregation device to at least a second subscriber network edge device located away from the service provider network with respect to the network aggregation device.

4. The method of claim 1, wherein the selecting comprises preferentially selecting at least one IP flow over at least one other IP flow on the basis of the at least one IP flow having a higher utility metric than the at least one other IP flow.

5. The method of claim 1, wherein the at least one utility metric is calculated at least in part on the basis of one or more destination IP addresses associated with the at least one IP flow for which traffic would be forwarded by the network aggregation device to next hop subscriber network edge devices located away from the service provider network with respect to the network aggregation device.

6. The method of claim 1, comprising in response to selecting in the subset a given IP flow from the identified plurality of IP flows, further selecting in the subset IP flows from the identified plurality of IP flows which have a matching, longer destination IP address prefix than the given IP flow.

7. The method of claim 6, comprising identifying at least one IP flow in the further selected IP flows for which the first routing data indicates that the at least one service provider network edge device should forward traffic to a destination in the network other than at least one subscriber network edge device located away from the service provider network with respect to the network aggregation device,
wherein the identified at least one IP flow is configured to operate on the network aggregation device as an exception flow.

8. The method of claim 1, comprising identifying at least one IP flow corresponding to a node in the sub-tree of the node corresponding to the given IP flow node for which the first routing data indicates that the at least one service provider network edge device should forward traffic to a destination in the network other than at least one subscriber network edge device located away from the service provider network with respect to the network aggregation device,
wherein the identified at least one IP flow is configured on the network aggregation device to operate as an exception flow.

9. The method of claim 1, comprising calculating for each node in the tree data structure:
a cost quantity defined as the number of IP flows required to configure IP flows corresponding to the respective node and all of its descendant nodes on the network aggregation device; and
a benefit quantity defined as the number of IP destination addresses that match the destination IP address prefix of the respective node minus the number of IP destination addresses which match an exception IP flow,
wherein the selecting comprises preferentially selecting at least one IP flow over at least one other IP flow on the basis of the at least one IP flow having a higher benefit to cost ratio than the at least one other IP flow.

10. The method of claim 1, wherein the network aggregation device has a given amount of memory storage for storing the second routing data for the selected subset of IP flows, the method comprising:
performing the selection and configuring according to the following iterative steps until all of the IP flows in the plurality are selected and corresponding second routing data configured on the network aggregation device or the given amount of memory storage runs out of space,
a) searching the tree data structure for the node which has the largest benefit to cost ratio and whose cost is less than the amount of remaining memory storage space on the network aggregation device;
b) selecting all the IP flows corresponding to the node identified by the search and its descendants wherein second routing data for these IP flows is configured on the network aggregation device;
c) updating the cost and benefit quantities of all ancestors of the node identified by the search including removing the contribution to cost and benefit due to the node identified by the search; and
d) return to step a).

11. The method of claim 1, comprising determining the remaining memory storage space on the network aggregation device by querying the network aggregation device.

12. The method of claim 1, comprising determining the remaining memory storage space on the network aggregation device by estimating the remaining memory storage space on the network aggregation device, the estimation comprising:
initially setting the estimated remaining memory storage space to an arbitrary large value;
performing the selection and configuring according to steps a) to d) unless the configuring fails due to the given amount of memory storage having run out of space;
in response to the configuring failing:
deleting second routing data corresponding to IP flows configured on the network aggregation device in the current iteration; and
reducing the estimated remaining memory storage space by a predetermined value and performing the selection and configuring according to steps a) to d) until the configuring does not fail.

13. The method of claim 1, comprising monitoring traffic flowing on IP flows in the plurality and/or the traffic flowing on IP flows in the selected subset; and
preferentially selecting at least one IP flow over at least one other IP flow on the basis of the monitoring indicating that the at least one IP flow has a higher amount of traffic flowing than the at least one other IP flow.

14. The method of claim 13, wherein the monitoring comprises one or more of:
statistical sampling of forwarded packets,
tracking the number of packets for one or more IP flows, and
tracking the total amount of data for one or more IP flows.

15. The method of claim 1, comprising monitoring traffic flowing on IP flows in the plurality and/or the traffic flowing on IP flows in the selected subset; and
dynamically adapting the selection of IP flows to maximize the volume of traffic flowing on IP flows in the selected subset compared to the volume of traffic flowing on IP flows in the plurality.

16. The method of claim 1, wherein the second routing data is configured on a plurality of network aggregation devices arranged in a hierarchical tier arrangement.

17. The method of claim 1, wherein the second routing data is configured on a plurality of network aggregation devices arranged in a mesh arrangement.

18. A system for use in configuring a network aggregation device in a network, the system comprising:
at least one memory including computer program code; and
at least one processor in data communication with the at least one memory, wherein the at least one processor is configured to:

identify first routing data for a plurality of internet protocol (IP) flows configured on at least one edge device of a service provider network, wherein the edge device is located towards the service provider network from the network aggregation device;

calculate at least one utility metric for at least one IP flow in the identified plurality of IP flows, the at least one utility metric being calculated at least in part on the basis of one or more destination IP addresses associated with the at least one IP flow;

select a subset of IP flows from the identified plurality of IP flows at least in part on the basis of the calculated at least one utility metric;

configure second routing data for the selected subset of IP flows on the network aggregation device; and represent interdependencies between flows in the plurality of IP flows as a tree data structure,
  wherein each IP flow in the plurality is represented by a node in the tree data structure,
  wherein a destination IP address prefix of each IP flow determines a relative location of its corresponding node in the tree data structure,
  wherein child nodes are destination IP address prefix subsets of their parent nodes, and
  wherein in response to selecting in the subset a given IP flow represented in the tree data structure, the selection comprises to further select in the subset IP flows corresponding to nodes in a sub-tree of the node corresponding to the given IP flow.

19. A non-transitory computer-readable storage medium comprising computer-executable instructions which, when executed by a processor, cause a computing device to perform a method of configuring a network aggregation device in a network, the method comprising:

identifying first routing data for a plurality of internet protocol (IP) flows configured on at least one edge device of a service provider network, wherein the edge device is located towards the service provider network from the network aggregation device;

calculating at least one utility metric for at least one IP flow in the identified plurality of IP flows, the at least one utility metric being calculated at least in part on the basis of one or more destination IP addresses associated with the at least one IP flow;

selecting a subset of IP flows from the identified plurality of IP flows at least in part on the basis of the calculated at least one utility metric;

configuring second routing data for the selected subset of IP flows on the network aggregation device; and representing interdependencies between flows in the plurality of IP flows as a tree data structure,
  wherein each IP flow in the plurality is represented by a node in the tree data structure,
  wherein a destination IP address prefix of each IP flow determines a relative location of its corresponding node in the tree data structure,
  wherein child nodes are destination IP address prefix subsets of their parent nodes, and
  wherein in response to selecting in the subset a given IP flow represented in the tree data structure, the selecting comprises further selecting in the subset IP flows corresponding to nodes in a sub-tree of the node corresponding to the given IP flow.

* * * * *